(12) United States Patent
Trevino et al.

(10) Patent No.: US 7,541,309 B2
(45) Date of Patent: Jun. 2, 2009

(54) REFORMING NANOCATALYSTS AND METHODS OF MAKING AND USING SUCH CATALYSTS

(75) Inventors: Horacio Trevino, Annandale, NJ (US); Zhenhua Zhou, Lawrenceville, NJ (US); Zhihua Wu, Plainsboro, NJ (US); Bing Zhou, Cranbury, NJ (US)

(73) Assignee: Headwaters Technology Innovation, LLC, Lawrenceville, NJ (US)

(*) Notice: Subject to any disclaimer, the term of this patent is extended or adjusted under 35 U.S.C. 154(b) by 310 days.

(21) Appl. No.: 11/435,580

(22) Filed: May 16, 2006

(65) Prior Publication Data

US 2009/0114568 A1 May 7, 2009

(51) Int. Cl.
| | | |
|---|---|---|
| *B01J 31/00* | (2006.01) | |
| *B01J 23/00* | (2006.01) | |
| *B01J 23/58* | (2006.01) | |
| *B01J 23/56* | (2006.01) | |
| *C10G 35/00* | (2006.01) | |
| *C10G 35/04* | (2006.01) | |
| *C10G 35/06* | (2006.01) | |

(52) U.S. Cl. .................. 502/325; 502/150; 502/305; 502/327; 502/328; 502/332; 208/133; 208/134; 208/135; 208/136; 208/137; 208/138; 208/139

(58) Field of Classification Search ............... 502/150, 502/305–355; 208/133–139
See application file for complete search history.

(56) References Cited

U.S. PATENT DOCUMENTS

| | | |
|---|---|---|
| 3,625,879 A | 12/1971 | Horner et al. ............... 585/251 |
| 3,644,200 A | 2/1972 | Young .................... 208/120.15 |
| 3,674,706 A | 7/1972 | Box, Jr. et al. |
| 3,686,340 A | 8/1972 | Patrick et al. .............. 585/485 |
| 3,700,745 A | 10/1972 | Kovach et al. ............. 585/485 |
| 4,007,256 A | 2/1977 | Kim et al. |
| 4,028,274 A | 6/1977 | Kunz .......................... 502/184 |
| 4,053,531 A | 10/1977 | Kerr et al. ................... 585/476 |
| 4,064,154 A | 12/1977 | Chandra et al. |
| 4,083,803 A | 4/1978 | Oswald et al. |
| 4,128,627 A | 12/1978 | Dyer et al. |
| 4,148,750 A | 4/1979 | Pine |
| 4,157,355 A | 6/1979 | Addison ..................... 585/321 |
| 4,247,730 A | 1/1981 | Brunelle ..................... 585/489 |
| 4,279,883 A | 7/1981 | Izumi et al. ................. 423/584 |
| 4,297,205 A | 10/1981 | Mieville |
| 4,335,092 A | 6/1982 | Dalton, Jr. et al. |
| 4,336,239 A | 6/1982 | Dalton, Jr. et al. |
| 4,336,240 A | 6/1982 | Moseley et al. |
| 4,347,231 A | 8/1982 | Michaelson |
| 4,347,232 A | 8/1982 | Michaelson |
| 4,366,085 A | 12/1982 | Ikegami et al. ............. 502/155 |
| 4,379,778 A | 4/1983 | Dalton, Jr. et al. .......... 423/584 |
| 4,454,240 A | 6/1984 | Ganguli |
| 4,476,242 A | 10/1984 | Puskas et al. ............... 502/185 |
| 4,503,160 A | 3/1985 | Williams, Jr. |
| 4,513,098 A | 4/1985 | Tsao .......................... 502/216 |
| 4,595,666 A | 6/1986 | Ganguli |
| 4,701,428 A | 10/1987 | Bellussi et al. |
| 4,713,363 A | 12/1987 | Hucul ........................ 502/262 |
| 4,793,980 A | 12/1988 | Torobin |
| 4,824,976 A | 4/1989 | Clerici et al. |
| 4,826,795 A | 5/1989 | Kitson et al. ............... 502/184 |
| 4,832,821 A | 5/1989 | Swan, III |
| 4,832,938 A | 5/1989 | Gosser et al. ............... 423/584 |
| 4,937,216 A | 6/1990 | Clerici et al. |
| 4,937,220 A | 6/1990 | Nickols, Jr. ................ 502/185 |
| 4,983,558 A | 1/1991 | Born et al. |
| 4,999,326 A | 3/1991 | Sikkenga et al. |
| 5,017,535 A | 5/1991 | Schoonhoven et al. |
| 5,024,905 A | 6/1991 | Itoh et al. .................... 429/44 |
| 5,061,671 A | 10/1991 | Kitson et al. ............... 502/185 |
| 5,096,866 A | 3/1992 | Itoh et al. .................... 502/101 |
| 5,104,635 A | 4/1992 | Kanada et al. |
| 5,128,114 A | 7/1992 | Schwartz .................... 423/335 |
| 5,132,099 A | 7/1992 | Hiramatsu et al. |
| 5,132,480 A | 7/1992 | Tsutsui et al. ............... 585/489 |
| 5,166,372 A | 11/1992 | Crocco et al. |
| 5,180,573 A | 1/1993 | Hiramatsu et al. |
| 5,188,996 A | 2/1993 | Huang et al. |
| 5,214,168 A | 5/1993 | Zajacek et al. |
| 5,234,584 A | 8/1993 | Birbara et al. |
| 5,236,692 A | 8/1993 | Nagashima et al. |
| 5,320,821 A | 6/1994 | Nagashima et al. |
| 5,338,531 A | 8/1994 | Chuang et al. .............. 423/584 |
| 5,352,645 A | 10/1994 | Schwartz .................... 502/262 |
| 5,372,981 A | 12/1994 | Witherspoon |
| 5,378,450 A | 1/1995 | Tomita et al. ............... 423/584 |
| 5,391,531 A | 2/1995 | Ward |
| 5,399,344 A | 3/1995 | Yang et al. |
| 5,480,629 A | 1/1996 | Thompson et al. .......... 423/584 |

(Continued)

FOREIGN PATENT DOCUMENTS

EP 0 864 362 9/1998

(Continued)

OTHER PUBLICATIONS

Scott, et al., "Interaction between ruthenium and molybdenum in RuMo/Al$_2$O$_3$ catalysts", *Applied Catalysts A: General* 125 (1995) 71-79.

(Continued)

*Primary Examiner*—Patricia L Hailey
(74) *Attorney, Agent, or Firm*—Workman Nydegger

(57) ABSTRACT

Catalysts suitable for use in reforming hydrocarbons have a halogen promoter and a plurality of dispersed nanocatalyst particles supported on a solid support. The dispersed nanocatalyst particles are manufactured using a dispersing agent to control the size and/or crystal face exposure of the particles. The controlled size and dispersion of the nanocatalyst particles allows the reforming catalyst to be loaded with significantly less halogen promoter while still maintaining or increasing the catalyst's reforming performance. The catalysts of the present invention have shown improved $C_{5+}$ production with the significantly reduced levels of halogen promoter.

30 Claims, No Drawings

U.S. PATENT DOCUMENTS

| | | | |
|---|---|---|---|
| 5,496,532 A | 3/1996 | Monzen et al. | |
| 5,505,921 A | 4/1996 | Luckoff et al. | |
| 5,583,085 A | 12/1996 | Ward | |
| 5,698,488 A | 12/1997 | Birbara et al. | 502/325 |
| 5,767,036 A | 6/1998 | Freund et al. | 502/185 |
| 5,846,895 A | 12/1998 | Gila et al. | |
| 5,846,898 A | 12/1998 | Chuang et al. | 502/181 |
| 5,851,948 A | 12/1998 | Chuang et al. | |
| 5,859,265 A | 1/1999 | Muller et al. | 549/531 |
| 5,866,500 A | 2/1999 | Taguchi et al. | |
| 5,885,443 A | 3/1999 | Bogdan et al. | |
| 5,900,386 A | 5/1999 | Freund et al. | |
| 5,912,367 A | 6/1999 | Chang | |
| 5,925,588 A | 7/1999 | Chuang et al. | 502/181 |
| 5,961,948 A | 10/1999 | Wanngard | 423/584 |
| 5,965,101 A | 10/1999 | Goto et al. | |
| 5,972,305 A | 10/1999 | Park et al. | 423/587 |
| 5,976,486 A | 11/1999 | Thompson et al. | 423/584 |
| 6,001,762 A | 12/1999 | Harmer et al. | |
| 6,005,155 A | 12/1999 | Sun | |
| 6,040,490 A | 3/2000 | Ichioka et al. | 585/475 |
| 6,054,507 A | 4/2000 | Funaki et al. | 523/210 |
| 6,069,286 A | 5/2000 | Wu et al. | 585/485 |
| 6,090,858 A | 7/2000 | El-Sayed | 516/97 |
| 6,106,797 A | 8/2000 | Muller et al. | |
| 6,127,307 A | 10/2000 | Muller et al. | 502/162 |
| 6,159,267 A | 12/2000 | Hampden-Smith | 75/252 |
| 6,168,775 B1 | 1/2001 | Zhou et al. | 423/584 |
| 6,194,338 B1 | 2/2001 | Andolfatto et al. | 502/101 |
| 6,239,054 B1 | 5/2001 | Shukis et al. | |
| 6,284,213 B1 | 9/2001 | Paparatto et al. | |
| 6,331,500 B1 | 12/2001 | Tsuji et al. | |
| 6,387,346 B1 | 5/2002 | Bertsch-Frank et al. | 423/584 |
| 6,447,743 B1 | 9/2002 | Devic et al. | |
| 6,500,968 B2 | 12/2002 | Zhou et al. | |
| 6,500,969 B1 | 12/2002 | Zhou et al. | |
| 6,518,217 B2 | 2/2003 | Xing et al. | 502/230 |
| 6,528,683 B1 | 3/2003 | Heidemann et al. | 562/542 |
| 6,534,440 B2 | 3/2003 | Choudhary et al. | |
| 6,534,661 B1 | 3/2003 | Zhou et al. | 549/531 |
| 6,551,960 B1 | 4/2003 | Laine et al. | 502/327 |
| 6,576,214 B2 | 6/2003 | Zhou et al. | |
| 6,630,118 B2 | 10/2003 | Paparatto et al. | |
| 6,635,348 B1 | 10/2003 | Hampden-Smith et al. | |
| 6,649,140 B2 | 11/2003 | Paparatto et al. | |
| 6,676,919 B1 | 1/2004 | Fischer et al. | 423/584 |
| 6,713,036 B1 | 3/2004 | Vanden Bussche et al. | |
| 6,727,309 B1 | 4/2004 | Paiva et al. | |
| 6,740,615 B2 | 5/2004 | Zhou | 502/29 |
| 6,746,597 B2 * | 6/2004 | Zhou et al. | 208/138 |
| 6,776,606 B2 | 8/2004 | Haskew | 431/2 |
| 6,782,892 B2 | 8/2004 | Li et al. | 131/364 |
| 6,888,013 B2 | 5/2005 | Paparrato et al. | |
| 6,958,138 B1 * | 10/2005 | Devic | 423/584 |
| 7,011,807 B2 | 3/2006 | Zhou et al. | 423/584 |
| 7,045,479 B2 * | 5/2006 | Zhou et al. | 502/125 |
| 7,045,481 B1 | 5/2006 | Parasher et al. | |
| 7,449,423 B2 * | 11/2008 | Zhou et al. | 502/104 |
| 2001/0024634 A1 | 9/2001 | Bertsch-Frank et al. | |
| 2002/0022672 A1 | 2/2002 | Thunhorst et al. | |
| 2003/0010252 A1 | 1/2003 | Arita et al. | |
| 2003/0012686 A1 | 1/2003 | Andersen et al. | |
| 2003/0086853 A1 | 5/2003 | Devic | |
| 2003/0104936 A1 | 6/2003 | Mao et al. | |
| 2003/0121364 A1 | 7/2003 | Sun | |
| 2003/0215383 A1 | 11/2003 | Escrig et al. | |
| 2004/0013601 A1 | 1/2004 | Butz et al. | 423/584 |
| 2004/0037769 A1 | 2/2004 | Paparatto et al. | |
| 2004/0037770 A1 | 2/2004 | Fischer et al. | 423/584 |
| 2004/0081611 A1 | 4/2004 | Muller et al. | |
| 2004/0087441 A1 | 5/2004 | Bock et al. | |
| 2004/0102648 A1 | 5/2004 | Borgmeier et al. | |
| 2004/0151659 A1 | 8/2004 | Paparatto et al. | |
| 2004/0151660 A1 | 8/2004 | Paparatto et al. | |
| 2004/0184983 A1 | 9/2004 | Paparatto et al. | |
| 2004/0241502 A1 | 12/2004 | Chung et al. | 428/702 |
| 2005/0014636 A1 | 1/2005 | Zhou et al. | |
| 2006/0102521 A1 | 5/2006 | Zhou et al. | 208/138 |
| 2006/0243641 A1 * | 11/2006 | Zhou et al. | 208/135 |
| 2008/0045401 A1 * | 2/2008 | Zhou et al. | 502/60 |

FOREIGN PATENT DOCUMENTS

| | | |
|---|---|---|
| EP | 0 978 316 | 2/2000 |
| EP | 1 277 701 | 7/2002 |
| EP | 1 344 747 | 9/2003 |
| JP | 07069605 | 3/1995 |
| JP | 10324507 | 12/1998 |
| JP | 03024794 | 1/2003 |
| WO | WO 98/10863 | 3/1998 |
| WO | WO 00/59635 | 10/2000 |
| WO | WO 01/05501 | 1/2001 |
| WO | WO 02/14217 | 2/2002 |
| WO | WO 02/83550 | 10/2002 |
| WO | WO 02/92501 | 11/2002 |
| WO | WO 02/92502 | 11/2002 |
| WO | WO 03/14014 | 2/2003 |
| WO | WO 06/078352 | 7/2006 |

OTHER PUBLICATIONS

Adesina, "Hydrocarbon synthesis via Fischer-Tropsch reaction: travails and triumphs", *Applied Catalysts A: General* 138 (1996) 345-367.

Aksoylu, et al., "Interaction between Nickel and Molybdenum in Ni-Mo/$Al_2O_3$ catalysts: II CO hydrogenation", *Applied Catalysts A: General* 168 (1998) 399-407.

Aksoylu, et al., "Interaction between nickel and molybdenum in Ni-Mo/$Al_2O_3$ catalysts: III. Effect of impregnation strategy", *Applied Catalysts A: General* 183 (1999) 357-364.

Zhu, et al., "Catalytic partial oxidation of methane to synthesis gas over Ni-$CeO_2$", *Applied Catalysts A: General* 208 (2001) 403-417.

Morioka, et al., "Partial oxidation of methane to synthesis gas over supported Ni catalysts prepared from Ni-Ca/A1-layered double hydroxide", *Applied Catalysts A: General* 215 (2001) 11-19.

Chu, et al., "The partial oxidation of methane to syngas over the nickel-modified hexaaluminate catalysts $BaNi_yAl_{12-y}O_{19-\delta}$",*Applied Catalysts A: General* 235 (2002) 39-45.

Basile, et al., "Rh-Ni synergy in the catalytic partial oxidation of methane: surface phenomena and catalyst stability", *Catalysis Today* 77 (2002) 215-223.

Te, et al., "Comparative study of Rh/$Al_2O_3$ and Rh-Mo/$Al_2O_3$ catalysts", *Center for Catalytic Science and Technology*, Abstract, Oct. 4, 1994.

Lowenthal, et al., "Surface Chemistry of Rh-Mo/$\gamma$-$Al_2O_3$ : An Analysis of Surface Acidity," *Journal of Catalysis* 156, 96-105 (1995).

Ahmadi, et al., "Shape-Controlled Synthesis of Colloidal Platinum Nanoparticles", *Science*, vol. 272, pp. 1924-1926 (Jun. 28, 1996).

Li, et al., "Carbon Nanotubes as Support for Cathode Catalyst of a Direct Methanol Fuel Cell", *Letters to the Editor/Carbon 40*, Dalian University of Technology, pp. 787-803 (Jan. 18, 2002).

Li, et al., "Preparation and Characterization of Multiwalled Carbon Nanotube-Supported Platinum for Cathode Catalysts of Direct Methanol Fuel Cells", *J. Phys. Chem*, B, vol. 107, pp. 6292-6299 (Jun. 6, 2003).

Lordi, et al., "Method for Supporting Platinum on Single-Walled Carbon Nanotubes for a Selective hydrogenation Catalyst", *Chem. Mater.*, vol. 13, pp. 733-737 (Feb. 10, 2001).

Zhou, et al., "Novel Synthesis of Highly Active Pt/C Cathode Electrocatalyst for Direct Methanol Fuel Cell" *Chem. Commun.* 2003, pp. 394-395.

Zhou, et al. "Preparation and Characterization of Anode Catalysts PtRu/C for Direct Methanol Fuel Cells" *Chemical Journal of Chinese Universities*, vol. 24, 2003, pp. 885-862.

Office Action for U.S. Appl. No. 11435165, dated Aug. 8, 2007, 13 pgs.

Nashner et al., "Structural Characterization of Carbon-Supported Platinum-Ruthenium Nanoparticles from the Molecular Cluster Precursor PtRu$_5$C(CO)$_{16}$", Journal of the American Chemical Society, 1997, 119, 7760-7771.

Sun et al., "Monodisperse FePt Nanoparticles and Ferromagnetic FePt Nanycrystal Superlattices", Mar. 17, 2000, Science, vol. 287, pp. 1989-1992.

Bonnemann et al., "Nanoscale colloidal metals and alloys stabilized by solvents and surfactants Preparation and use as catalyst precursors", Journal of Organometallic Chemistry 520 (1996), 143-162.

Kim et al., "Preparation and characterization of Au-Ag and Au-Cu alloy nanoparticles in chloroform", Journal of Materials Chemistry, 2003, 13, 1789-1792.

Office Action dated Jan. 9, 2008 cited in U.S. Appl. No. 11/435,165.

Office Action dated Mar. 6, 2008 cited in U.S. Appl. No. 11/435,165.

Office Action dated May 30, 2008 cited in U.S. Appl. No. 11/435,165.

Office Action dated Mar. 27, 2008 cited in U.S. Appl. No. 10/990,616.

Office Action dated Jul. 18, 2008 cited in U.S. Appl. No. 10/990,616.

Office Action dated Mar. 27, 2008 cited in U.S. Appl. No. 11/103,676.

Office Action dated Aug. 13, 2008 cited in U.S. Appl. No. 11/103,676.

Office Action dated Mar. 21, 2008, cited in U.S. Appl. No. 11/101,241.

Office Action dated Aug. 19, 2008 cited in U.S. Appl. No. 11/101,241.

Search Report from PCT/US05/42841.

* cited by examiner

REFORMING NANOCATALYSTS AND METHODS OF MAKING AND USING SUCH CATALYSTS

BACKGROUND OF THE INVENTION

1. The Field of the Invention

The present invention relates generally to catalysts for use in reforming hydrocarbons and methods for making and using such catalysts. More particularly, the present invention relates to reforming catalysts comprising supported nanocatalyst particles and a halogen promoter.

2. The Relevant Technology

Naphtha is a volatile, flammable liquid mixture of hydrocarbons distilled from petroleum or other fossil fuel sources. Naphtha can be used as a fuel, a solvent, or in making various chemicals. Typically naphtha is a mixture of hydrocarbons that boil between about 65° C. and about 195° C. and is obtained by processing crude oil and optionally heavy oil fractions.

Naphtha reforming is an important refinery process where naphtha is upgraded into more valuable hydrocarbons having a higher octane rating. In reforming, naphtha is heated and fed into a series of reactors loaded with a solid supported metal catalyst. Typically, the catalyst contains platinum and one or more additional metals, which are supported on alumina. The catalyst also includes a halogen promoter that increases the rate of reforming. The halogen promoter is typically included in an amount that is significantly greater than 1% by weight of the total catalyst.

The main goal of the reforming process is to convert the feed into a liquid product stream with a higher octane number. The octane number is a measure of the performance of the hydrocarbons in a gasoline internal combustion engine. Thus, naphtha reforming converts hydrocarbons streams into a reformate product that is more suitable as a gasoline blending stock. The octane number gain during the reforming process varies depending on, among other factors, the original crude and the reforming conditions. Typical octane value increases are in a range between 30 and 70.

The reforming process involves various parallel and consecutive reactions. The reforming process improves octane by increasing the percentage of branched and/or aromatic compounds. In addition to the production of gasoline blending stocks, reforming is a very significant source of aromatics (e.g., BTX), which are used extensively in the chemical and petrochemical industries (e.g., as solvents or starting materials). The reforming process is also the only refinery operation that yields a net production of hydrogen. Hydrogen is extremely valuable because it finds extensive use elsewhere in a refinery, particularly for the upgrading of low quality hydrocarbon streams.

Among the multiple reactions taking place during the reforming operation, some of them are undesirable, at least to some extent. One of these reactions is hydrocracking, which occurs when a hydrocarbon chain is broken apart into two smaller molecules with a net consumption of hydrogen. Hydrocracking in the reforming process can be undesirable because it consumes valuable hydrogen and can produce smaller hydrocarbon fragments outside the range of liquid reformate product, which is $C_5$ hydrocarbons and heavier ($C_{5+}$ hydrocarbons). Light gases ($C_1$-$C_4$ hydrocarbons) formed by hydrocracking are not a desired reformate product. Production of $C_1$-$C_4$ hydrocarbons during reforming is considered a loss that reduces the overall yield of the reforming process. While reforming catalysts are essential to improving octane number, reforming catalysts are also known to catalyze hydrocracking.

BRIEF SUMMARY OF THE INVENTION

The present invention relates to supported reforming catalysts having a relatively small quantity of a halogen promoter and a plurality of dispersed nanocatalyst particles supported on a solid support. The dispersed nanocatalyst particles are manufactured using a dispersing agent to control the size and/or crystal face exposure of the particles. The controlled size and dispersion of the nanocatalyst particles surprisingly allows the reforming catalyst to be loaded with significantly less halogen promoter while still maintaining or increasing the catalyst's reforming performance. The catalysts of the present invention have shown improved $C_{5+}$ production and reduced $C_1$-$C_4$ production with significantly reduced levels of halogen promoter.

The method for manufacturing the nanocatalyst particles according to the present invention generally includes (i) providing a plurality of catalyst atoms selected from the group of platinum, palladium, rhodium, and iridium; (ii) providing a dispersing agent comprising a plurality of organic molecules that have at least one functional group capable of binding to the plurality of catalyst atoms; (iii) reacting the dispersing agent with the catalyst atoms to form a catalyst precursor composition; (iv) causing or allowing the catalyst complexes to form nanocatalyst particles having a size less than about 100 nm and supporting the nanocatalyst particles on a solid catalyst support; and (v) including a halogen promoter in the reforming catalyst in an amount from about 0.2% and up to less than 1.0% by weight of the reforming catalyst. At a promoter loading of 1.0 wt % and above, a substantial increase in $C_1$-$C_4$ production occurs.

In a preferred embodiment, the reforming catalysts are multicomponent supported nanocatalysts. Multicomponent catalyst typically include platinum, palladium, rhodium, or iridium as a primary component and one or more of the following as a secondary catalyst component: tin, rhenium, germanium, lead, arsenic, antimony, tungsten, osmium, cadmium, indium, titanium, phosphorus, gallium, ruthenium, calcium, magnesium, barium, or strontium. The secondary catalyst component(s) can be selected to increase catalytic activity, promote other useful reactions, and/or help prevent catalyst deactivation by, e.g., coking.

The supported nanocatalyst particles of the present invention are advantageously very small. The methods of the present invention can produce nanocatalyst particles having a particle size less than about 100 nm, less than about 50 nm, or even smaller than about 5 nm. Providing catalyst particles in the nano range allows for highly active and highly efficient catalysts.

The reforming catalysts of the present invention are particularly useful in promoting reforming reactions with naphtha, such as for gasoline blending. Pt—Re catalysts prepared using the methods of the present invention and used for naphtha reforming show significant performance advantage over existing commercial catalysts. For example, the catalyst show improvements in octane number gain in the reformate product. More importantly the catalysts of the present invention show a drastic decrease in light gas formation. Light gas formation can be reduced by about 5 wt %. The decrease in light gas formation translates into a significantly higher recovery of liquid reformate product and a significantly higher octane barrel number, which takes into account octane number gain as well as the fraction of $C_{5+}$ recovered. By this measure (i.e., octane-barrel), catalysts prepared according to the present invention substantially outperform state-of-the-art commercially available catalysts. The catalysts of the present invention have been observed to increase octane barrel numbers by more than 5 units as compared to commercially available reforming catalysts (e.g., where a commercial catalyst has a octane barrel number increase of 50 the catalyst of the present invention would typically have an increase of about 55).

These and other advantages and features of the present invention will become more fully apparent from the following description and appended claims as set forth hereinafter.

DETAILED DESCRIPTION OF EXEMPLARY EMBODIMENTS

The present invention is directed to the manufacture of novel reforming catalysts useful for reforming naphtha to enhance octane barrel number. The nanocatalyst particles are supported on a support material and impregnated with less than 1.0 by weight of a halogen promoter. The amount of halogen promoter included in the catalysts is limited to improve the production of $C_{5+}$ liquid reformate.

In an exemplary embodiment, an organic dispersing agent is used that bonds to the catalyst atoms and determines, at least in part, the molecular arrangement of the catalyst atoms. These nanocatalyst particles can be used to form supported reforming catalysts with improved and/or selective catalytic activity and with increased longevity.

For purposes of disclosure and the appended claims, the term "nanoparticles" or "nan6-sized particles," means particles with a diameter of less than about 100 nanometers (nm).

The term "catalyst precursor" refers to a solution, colloid or suspension in which a bond or coordination complex is formed between a dispersing agent and one or more different types of catalyst atoms. The "bond" between the dispersing agent and catalyst atoms may be ionic, covalent, electrostatic, or it may involve other bonding forces such as coordination with nonbonding electrons, Van Der Waals forces, and the like.

The term "crystal face" refers to the top or outer layer of active catalyst atoms within a catalyst crystal. The terms "crystal face exposure" and "crystal face exposition" refer to the specific arrangement of catalyst atoms within a particular crystal face (e.g, low index crystal face exposures (100), (110), and (111)).

The terms "controlled phase exposition" or "controlled face exposure" are used herein to refer to the situation where a catalytic crystal or particle has a top or outer layer of catalyst atoms in a desired coordination structure.

II. Reforming Catalysts

The reforming catalysts of the present invention include (i) a support material, (ii) a halogen promoter, and (iii) a plurality of nanocatalyst particles.

A. Supports and Support Materials

The nanocatalyst particles are formed on or applied to a solid support material. Any solid support suitable for use under reforming conditions can be used as a support for the nanocatalyst particles of the present invention.

These supports may be in a variety of physical forms. They may be either porous or non-porous. They may be 3-dimensional structures such as a powder, granule, tablet, extrudates, or other 3-dimensional structure. Supports may also be in the form of 2-dimensional structures such as films, membranes, coatings, or other mainly 2-dimensional structures. It is even conceivable for the support to be a 1-dimensional structure, such as ultra-thin fibers and filaments.

In an exemplary embodiment, the support is a porous inorganic material. These include, but are not limited to, alumina, silica, silica gel, titania, kieselguhr, diatomaceous earth, bentonite, clay, zirconia, magnesia, as well as the oxides of various other metals, alone or in combination. They also include the class of porous solids collectively known as zeolites, natural or synthetic, which have ordered porous structures.

B. Halogen Promoter

A halogen is incorporated into the support and/or catalyst particles as a promoter. The preferred halogen promoter is chloride ion. It has been found that reforming catalysts made with a dispersing agent have optimal performance when the promoter is included in a range from about 0.2% by weight to less than 1.0% by weight of the reforming catalyst. More preferably the promoter is included in an amount ranging from about 0.3 wt % to about 0.9 wt %, even more preferably between about 0.4 wt % and about 0.7 wt %, and most preferably between about 0.45 wt % to about 0.6 wt %. In yet another preferred range, the promoter is included in an amount between about 0.4 wt % to about 0.9 wt %. These ranges provide the benefit of promoting desirable reforming reactions while minimizing undesirable hydrocarbon reactions that produce light hydrocarbons ($C_1$-$C_4$ hydrocarbons).

The halogen promoter can be impregnated into the support or otherwise deposited on the catalyst and/or support using any known techniques. In one embodiment, the halogen promoter is dissolved in a solvent and soaked into the support. The solvent is then removed by drying to leave the promoter on the support material in the desired wt %. For purposes of the invention, the wt % of promoter is measured according to the total dry weight of the reforming catalyst, which includes the support and the nanocatalyst particles.

The halogen promoter can be added to the support prior to supporting the nanocatalyst particles thereon or after the nanocatalyst particles have been supported or a combination of both of these methods. Where the nanoparticles have been manufactured using a metal salts and the metal salt includes a halide ion, the metal salt solution can be used to provide a portion of the halogen promoter. Leaving the halide ion supplied by the metal salt solution on the catalyst avoids the extra step of washing the catalyst to remove the halide ions. However, if desired, the supported nanoparticle catalyst can be washed to remove the halide and then fresh halide in the desired wt % can be applied to the support. Support materials with all or a portion of the desired amount of halogen promoter can be purchased from commercial sources.

C. Nanocatalyst Particles

The nanocatalyst particles are nanometer-sized particles of catalytically active metals (e.g., platinum and rhenium). Pluralities of nanocatalyst particles are deposited on the support material. The nanocatalyst particles have a diameter of less than about 100 nm, more preferably less than about 50 nm, and most preferably less than about 10 nm. The nanocatalyst particles are preferably substantially evenly dispersed on the surface of the support material.

As discussed more fully below, the nanoparticle catalysts are manufactured using a dispersing agent. It is believed that the dispersing agent is at least partially responsible for the production of nanocatalyst particles smaller than about 100 nm. It is also believed that the small particle size and uniform dispersion and composition of the nanocatalyst particles on the support material allow for the amount of promoter to be reduced while maintaining high catalyst performance. Since the promoter is typically disposed on the support, having smaller catalyst particles allows for many of the active catalysts sites to be closer to the promoter on the surface as compared to larger catalyst particles (e.g., micron-sized or larger). Active sites near the promoter are less diffusion limited and thus more efficient. This improved efficiency of the promoter allows for significantly less of the promoter to be used while achieving a desired catalyst performance. The reduced amount of promoter leads to less hydrocracking and loss of $C_{5+}$ hydrocarbons as $C_1$-$C_4$ hydrocarbons.

Optionally, the nanocatalyst particles can be manufactured to have a desired coordination structure. If desired, the nanocatalyst particles can have a {111} crystal face exposure or a {110} crystal face exposure. As discussed more fully below with regard to the method of making the nanocatalyst particles, the coordination structure can be controlled by selecting particular dispersing agents. The coordination structure can be controlled to produce nanocatalyst particles that have particular selectivity for a desired reaction. Additional details regarding forming catalyst nanoparticles having a controlled coordination structure are available in applicant's U.S. Pat. Nos. 6,746,597, issued Jun. 8, 2004, and 7,011,807, issued Mar. 14, 2006, both of which are incorporated herein by reference.

The nanoparticles can be deposited in a wide range of loadings on the support material. The loading can range from 0.01% to 90% by weight of the total weight of the supported nanoparticles. The preferred loading is typically about 0.05% to about 5%.

The catalytic materials, dispersing agents, and other components which may be selected to form nanocatalyst particles according to the present invention will now be discussed in detail.

III. Components Used to Make Nanocatalyst Precursor Compositions and Nanocatalyst Particles The nanocatalyst particles are generally manufactured from a plurality of catalyst atoms, a dispersing agent, and a solvent or carrier. In addition to these components, the support material can also be used to influence particle formation.

A. Catalyst Atoms

The catalyst atoms that form the catalyst nanoparticles of the present invention can include any metal, or combination of one or more metals or other elements, that exhibit catalytic reforming activity. Examples of useful catalyst atoms include one or more noble metals, which include platinum, palladium, iridium, gold, osmium, ruthenium, rhodium, and rhenium. Examples of other catalyst atoms include one or more base transition metals, rare earth metals, alkaline earth metals, alkali metals, and even non metals, which can be used alone or complexed or alloyed with other catalyst materials.

Platinum (Pt) is particularly useful as the primary catalyst component in reforming catalysts. Though less preferred, palladium (Pd), rhodium (Rh) and iridium (Ir) may also be used as the primary catalyst component, or they may be used in combination with platinum as a secondary catalyst component. Tin (Sn) and rhenium (Re) can be beneficially used in combination with platinum as a secondary catalyst component, as can be various other components such as germanium (Ge), lead (Pb), arsenic (As), antimony (Sb), tungsten (W), osmium (Os), cadmium (Cd), indium (In), titanium (Ti), phosphorus (P), gallium (Ga), ruthenium (Ru), calcium (Ca), magnesium (Mg), barium (Ba), and strontium (Sr).

As described below, the catalyst atoms are added to an appropriate solvent or carrier to form a solution or suspension. Catalyst atoms can be added to a solution in elemental (e.g., metallic) form, or added in ionic form. Typically, the catalyst atoms are added in ionic form so as to more readily dissolve or disperse within the solvent or carrier. Examples of suitable ionic forms include metal halides, nitrates or other appropriate salts that are readily soluble in a solvent or carrier. Specific examples include metal phosphates, sulfates, tungstates, acetates, citrates, and glycolates.

Metal components that are compounds themselves, such as oxides, can be added to a liquid medium in the appropriate compound form, or may be in a different chemical form that is converted to the appropriate chemical form during catalyst formation.

When added to an appropriate solvent or carrier to form an intermediate precursor composition, the catalyst atoms will typically be in ionic form so as to more readily dissolve or disperse within the solvent or carrier. In the case of a metallic catalyst, the catalyst atoms may be in the form of a metal halide, nitrate or other appropriate salt that is readily soluble in the solvent or carrier, e.g., metal phosphates, sulfates, tungstates, acetates, citrates, or glycolates.

B. Dispersing Agents

The dispersing agent is selected to promote the formation of a nanocatalyst particle with a desired size, shape, and/or controlled coordination structure. Dispersing agents within the scope of the invention include a variety of small organic molecules, as well as polymers and oligomers. Exemplary dispersing agents are able to interact and complex with catalyst atoms that are dissolved or dispersed within an appropriate solvent or carrier through various mechanisms, including ionic bonding, covalent bonding, Van der Waals interaction/bonding, or hydrogen bonding.

To provide bonding between the dispersing agent and the catalyst atoms, the dispersing agent includes one or more appropriate functional groups. Suitable functional groups for complexing the dispersing agent with the catalyst atoms include one or more of a hydroxyl, a carboxyl, an amine, a nitrogen having a lone pair of electrons, a thiol, an ester, an amide, a ketone, an aldehyde, a sulfonic acid, an acyl halide, a sulfonyl halide, and combinations of these. The functional group can also be a derivative of one of the foregoing. Derivatives include, for example, any of the foregoing functional groups that have been protenated or deprotenated.

The dispersing agent can be monofunctional, bifunctional, or polyfunctional. Examples of suitable monofunctional dispersing agents include carboxylic acids such as formic acid and acetic acid. Useful bifunctional dispersing agents include diacids such as oxalic acid, malonic acid, maleic acid, and the like; dialcohols such as ethylene glycol, propylene glycol, 1,3-propanediol, and the like; and hydroxy acids such as glycolic acid, lactic acid, and the like. Useful polyfunctional dispersing agents include sugars such as glucose, polyfunctional carboxylic acids such as citric acid, hydroxy diacids, and the like.

Other useful dispersing agents include ethanolamine, mercaptoethanol, 2-mercaptoacetate, amino acids such as glycine and alanine, sulfonic acids such as sulfobenzyl alcohol and sulfobenzoic acid, and other sulfobenzyl compounds having amino and thiol functional groups.

Dispersing agents according to the invention also include polymers or oligomers, which can be natural or synthetic. In the case where the dispersing agent is an oligomer or polymer, the molecular weight, measured in number average, is preferably in a range from about 300 to about 15,000 Daltons, more preferably in a range of about 600 to about 6000 Daltons. However, it is recognized that even high molecular weight polymers, i.e., greater than 15,000, can be used as the dispersing agent if they are readily soluble in solvents, carriers or vehicles and can complex with the catalyst atoms.

The molecular weight of the polymer or oligomer molecules may be selected to yield a dispersing agent having a desired number of functional groups per molecule. In general, the number of functional groups may range from 4 to 200 functional groups per molecule, preferably from about 8 to about 80 functional groups, and more preferably from about 10 to about 20 functional groups. In many cases, the number of functional groups within a polymer or oligomer at least approximately corresponds to the number of repeating units.

Suitable polymers and oligomers within the scope of the invention include, but are not limited to, polyacrylic acid, polyacrylates, polyvinylbenzoates, polyvinyl sulfate, polyvinyl sulfonates, including sulfonated styrene, polybisphenol carbonates, polybenzimidizoles, polypyridine, sulfonated polyethylene terephthalate. Other suitable polymers include polyvinyl alcohol, polyethylene glycol, polypropylene glycol, and the like. The present invention also includes derivatives of the foregoing dispersing agents. Derivatives include, for example, salts and esters of the foregoing molecules.

It may be advantageous to provide an excess of the dispersing agent so as to provide an excess of functional groups relative to the number of catalyst atoms. Including an excess of functional groups helps to ensure that all or substantially all of the catalyst atoms are complexed by the dispersing agent. Providing an excess of dispersing agent can also help to ensure the availability of functional groups for bonding the catalyst to a substrate where such bonding is desired.

In addition to the characteristics of the dispersing agent, it can also be advantageous to control the molar ratio of dispersing agent functional groups to catalyst atoms. For example, in the case of a divalent metal ion, two molar equivalents of a monovalent functional group would be necessary to provide the theoretical stoichiometric ratio. It may be desirable to provide an excess of dispersing agent functional groups to (1) ensure that all or substantially all of the catalyst atoms are complexed, (2) bond the nanoparticles to a support, and (3) help keep the nanoparticles segregated so that they do not clump or agglomerate together. In general, it will be preferable to include a molar ratio of dispersing agent functional groups to catalyst atoms in a range of about 100:1 to about 1:100 and more preferably in a range of about 30:1 to about 1:30.

The dispersing agents of the present invention allow for the formation of very small and uniform nanoparticles. In a preferred embodiment, the catalyst nanoparticles formed in the presence of the dispersing agent are preferably less than about 100 mm, more preferably less than about 10 nm, even more preferably less than about 6 nm, more especially preferably less than about 5 nm, and most preferably less than about 4 nm.

As discussed below, the nanocatalyst particles are supported on a support surface. It is believed that when a support material is added to a suspension or solution of the catalyst complexes, the dispersing agent acts to uniformly disperse the complexed catalyst atoms and/or suspended nanoparticles onto the support material. The dispersing agent can be selected such that it acts as an anchor between the nanocatalyst particles and a support material, which is described more fully below. During and after formation of the nanocatalyst particles, the dispersing agent can act as an anchoring agent to secure the nanoparticle to a substrate. Preferably, the substrate has a plurality of hydroxyl or other functional groups on the surface thereof which are able to chemically bond to one or more functional groups of the dispersing agent, such as by a condensation reaction. One or more additional functional groups of the dispersing agent are also bonded to one or more atoms within the nanoparticle, thereby anchoring the nanoparticle to the substrate.

While the dispersing agent has the ability to inhibit agglomeration without anchoring, chemically bonding the nanoparticle to the substrate surface through the dispersing agent is an additional and particularly effective mechanism for preventing agglomeration.

According to one embodiment, the dispersing agent is optionally selected to yield reforming catalysts having predominantly a {111} crystal face exposure. In general, small molecule dispersing agents (e.g., citric acid, glycolic acid, lactic acid, and ethylene glycol) and branched oligomers or polymers (e.g., branched polyacrylic acid) have been found to promote the formation of supported catalyst particles having a {111} crystal face exposure.

In an alternative embodiment, the dispersing agent is optionally selected to yield reforming catalysts with a predominantly {110} crystal face exposure. Straight-chained polymers (e.g., polyacrylic acid) have been shown to be effective for making nanocatalyst particles having a {110} crystal face.

In a preferred embodiment, the dispersing agent is selected to generate nanocatalyst particles having a desired crystal face exposure that is at least about 50% {111} or at least about 50% {110}, more preferably at least about 70% {111} or at least about 70% {110}, and most preferably at least about 90% {111} or at least about 90% {110}.

D. Solvents and Carriers

A solvent or carrier can be used as a vehicle for the combining of the catalyst atoms (typically in the form of an ionic salt) and/or the dispersing agent. The solvent used to make the inventive precursor compositions may be an organic solvent, water or a combination thereof. Organic solvents that can be used include alcohols, ethers, glycols, ketones, aldehydes, nitriles, and the like.

Preferred solvents are liquids with sufficient polarity to dissolve the metal salts. These preferred solvents include water, methanol, ethanol, n-propanol, isopropyl alcohol, acetonitrile, acetone, tetrahydrofuran, ethylene glycol, dimethylformamide, dimethylsulfoxide, methylene chloride, and the like, including mixtures thereof.

Other chemical modifiers may also be included in the liquid mixture. For example, acids or bases may be added to adjust the pH of the mixture. Surfactants may be added to adjust the surface tension of the mixture and/or to stabilize the nanoparticles.

The solvent for the nanoparticle components may be a neat solvent, but it is preferable to use an acidic solution, as acids aid in the dissolution of the nanoparticle components. The solution may be acidified with any suitable acid, including organic and inorganic acids. Preferred acids are mineral acids such as sulfuric, phosphoric, hydrochloric, and the like, or combinations thereof. While it is possible to use an acid in a wide range of concentrations, relatively dilute solutions generally accomplish the desired solubility enhancement. Moreover, concentrated acid solutions may present added hazard and expense. Thus, dilute acid solutions are currently preferred.

IV. Methods of Making Nanocatalyst Particles and Supported Reforming Catalysts

Exemplary methods for manufacturing nanocatalyst particles according to the invention can be broadly summarized as follows. First, one or more types of catalyst atoms and one or more types of dispersing agent are selected. Second, the catalyst atoms (e.g., metals or other components) and the dispersing agent are reacted or combined together to form a catalyst precursor. Third, the catalyst precursor is allowed or caused to form nanocatalyst particles. The nanocatalyst particles are then supported on a support material (unless the nanocatalyst particles were formed in the presence of the support, in which case, the particles will have already been formed or deposited on the support material).

A catalyst precursor is generally formed by first dissolving the catalyst atoms and dispersing agent in an appropriate solvent or carrier and allowing the catalyst atoms to recombine as catalyst complexes in solution or suspension. In one embodiment, dispersed nanocatalyst particles form in the suspension. In an alternative embodiment, the dispersing agent facilitates the formation of nanocatalyst particles when deposited on a support material in one or more subsequent steps.

The catalyst atoms can be provided in any form so as to be soluble or dispersible in the solvent or carrier that is used to form the catalyst precursor. For example, catalyst atoms can be provided as metal salts that are readily dissolvable in the solvent or carrier. It may be advantageous to use metal chlorides and nitrates, since metal chlorides and nitrates are typically more soluble than other metal salts.

Catalyst atoms can be added to the solvent or carrier singly or in combination to provide final nanocatalyst particles that comprise a mixture of various types of catalyst atoms. For example, a platinum/tin reforming catalyst can be formed by first forming a precursor solution of platinum and a precursor solution of tin and then combining the precursor solutions. In general, the composition of the final nanocatalyst particles will be determined by the types of catalyst atoms added to the precursor solution. Therefore, control of the amounts of metal salts added to the precursor solution provides a convenient method to control the relative concentrations of different types of catalyst atoms in the final nanocatalyst particles.

The dispersing agent is added to the solvent or carrier in a manner so as to facilitate association of the dispersing agent with the catalyst atoms in order to form the catalyst precursor. Some dispersing agents may themselves be soluble in the solvent or carrier. In the case of dispersing agents that include carboxylic acid groups, it may be advantageous to form a metal salt of the acids (e.g., an alkali or alkaline earth metal salt). For example, polyacrylic acid can be provided as a sodium polyacrylate salt, which is both readily soluble in aqueous solvent systems and able to react with catalyst metal salts to form a metal-polyacrylate complex that may be soluble or which may form a suspension within the solvent or carrier.

One aspect of the invention is that very small nanocatalyst particles can be controllably formed. It is believed that the relative amounts (or ratio) of dispersing agent to catalyst atoms may play a factor in determining the size of the resulting catalyst nanoparticles. In general, providing a stoichiometric excess of dispersing agent helps reduce particle agglomeration, thereby also generally reducing the size of the nanoparticles. The catalyst precursor is then impregnated into or otherwise applied to a support material to yield an intermediate catalyst composition. In one embodiment, the catalyst precursor solution or suspension is physically contacted with a solid support.

Depending on the physical form of the solid support, the process of contacting or applying the catalyst precursor to the support may be accomplished by a variety of methods. For example, the support may be submerged or dipped into a solution or suspension comprising a solvent or carrier and the catalyst precursor. Alternatively, the solution or suspension may be sprayed, poured, painted, or otherwise applied to the support, such as by incipient wetness impregnation. Thereafter, the solvent or carrier is removed, optionally in connection with a reaction step that causes the dispersing agent to become chemically bonded or adhered to the support. Either way, the process yields a supported catalyst or intermediate supported catalyst composition.

According to one embodiment, the intermediate catalyst composition is heat treated to further activate or prepare the supported catalyst atoms or particles for use in the catalytic reforming of naphtha for octane number enhancement and/or BTX formation. It has been found that, in some cases, subjecting the nanocatalyst particles to a heat treatment process before using the reforming catalyst causes the catalyst to be more active initially. In one embodiment, the heat treatment is performed to volatilize unwanted molecules from the nanocatalyst particles. Heat treating can also be performed to increase the anchoring of the nanocatalyst particles to the support material. For example, in a naphtha reforming catalyst, progressively heating to 500° C. can improve the bonding between the nanocatalyst particles and a support material such as alumina or silica. Heat treatment can cause initial formation of nanocatalyst particles from individual complexed atoms in the case where nanoparticles are not formed in suspension prior to applying the catalyst precursor to the support material.

In an exemplary embodiment, the heat treatment process is carried out in an inert or oxidizing environment and with the catalyst atoms at least initially in a non-zero oxidation state. Additional details regarding heat treating in a non-zero oxidation state can be found in applicant's co-pending U.S. patent application Ser. No. 11/101,241, which is hereby incorporated herein by reference.

The heat treating process of the present invention is preferably carried out at a temperature in a range of about 50° C. to about 600° C., more preferably in a range of about 100° C. to about 500° C., and most preferably in a range of about 150° C. to about 400° C. The duration of the heat treatment process is preferably in a range of about 5 minutes to about 24 hours, more preferably in a range of about 30 minutes to about 12 hours, and most preferably in a range of about 1 hour to about 6 hours. A preferred inert environment for performing the heat treating step includes $N_2$.

If desired, the catalyst nanoparticles can be reduced prior to using the reforming catalyst by using a reducing procedure (e.g., hydrogenation). Hydrogen is one preferred reducing agent. Instead of, or in addition to, using hydrogen as the reducing agent, a variety of other reducing agents may be used, including but not limited to, lithium aluminum hydride, sodium hydride, sodium borohydride, sodium bisulfite, sodium thiosulfate, hydroquinone, methanol, aldehydes, carbon monoxide, ammonia, and the like. The reduction process may be conducted at a temperature between 20° C. and 600° C. In an exemplary embodiment, the catalyst nanoparticles are partially reduced to a non-zero oxidation state before calcining.

Finally the reforming catalyst can be further processed into a finished product of size and shape suitable for a specific reactor or process configuration. For example, a powder may be processed by, among other methods, extrusion, pelletizing, or spray drying.

V. Methods of Reforming Hydrocarbons

Reforming catalysts according to the invention can be used in reforming hydrocarbons such as naphtha. Reforming catalysts can be used in dehydrogenation of naphthenes to produce aromatics, isomerization of linear paraffins to form branched paraffins or iso-paraffins, and dehydrocyclization of paraffins to form aromatics, among other reactions. Reforming catalysts can be used to enhance octane number for fuel blending and/or in BTX reactions to yield benzene, toluene, xylenes, ethyl benzene, and other aromatic compounds.

The reforming catalysts according to the invention are superior to reforming catalysts known in the art because the catalyst of the present invention can increase the octane number of hydrocarbons while significantly increasing the $C_{5+}$ production, when used in a reforming reaction. The increased octane number and $C_{5+}$ production results in a substantial improvements in octane barrel number as compared to conventional reforming catalysts.

The reforming process is typically carried out in a reactor. Three suitable reactor configurations for reactions such as naphtha catalytic reforming include: a) the semi-regenerative process, where the catalyst is regenerated every 6 to 24 months, and requires that the reactor be shut down; b) the cyclic process where a spare reactor is brought online while another is taken offline for catalyst regeneration; and c) the continuous catalyst regeneration (CCR) process, where the catalyst continuously circulates from the top to the bottom of the reforming reactor and is then fed to an external regeneration unit for reactivation and then sent to the top of the reactor.

Typically, the reforming catalyst is first loaded into the reactor and subjected to a reductive treatment. This treatment usually includes heating the catalyst to a high temperature (400° C.-525° C.) in a pure hydrogen environment. Naphtha is then continuously fed into the reactor with continuously flowing hydrogen. Typical hydrogen to hydrocarbon molar ratios are between 3 and 8.

Reaction conditions are chosen as a compromise among maximizing octane gain, minimizing losses to light gases, and extending catalyst lifetime. Catalytic naphtha reforming is performed in a hydrogen atmosphere to facilitate the hydrogenation of coke precursors, thus minimizing catalyst deactivation and equipment fouling. At the same time, higher partial pressures of hydrogen tend to inhibit dehydrogenation reactions. Total operating pressures range between about 300 kPa to about 3.5 MPa. With respect to temperature, higher values favor both higher octane numbers in the reformate and hydrocracking producing light gases. Typical operating temperatures are between about 460° C. and about 525° C.

VI. Examples

The following exemplary procedures where used to prepare reforming catalysts according to the present invention and to test their ability to improve the octane number of a naphtha feed stock.

Comparative Example 1

Commercial Catalyst

Example 1 is a commercial catalyst used as benchmark. The formulation according to the manufacturer was 0.25% wt Pt, 0.40% wt Re, and 1.0% wt Cl, supported on 1/16" ≠-alumina extrudates.

Example 2

Example 2 describes a method of manufacturing a Pt—Re reforming catalyst using a dispersing agent according to the present invention and loading the catalyst with 0.96 wt % Cl.

10 ml of an aqueous $HReO_4$ solution containing 0.01321 g Re/ml solution was mixed with 8 ml of an aqueous $H_2PtCl_6$ solution containing 0.0103 g Pt/ml solution. The above solution was further diluted to 30 ml by adding 12 ml of deionized (DI) water. 437 mg of citric acid was added into the above solution. After dissolving citric acid into the Pt—Re solution by stirring, 552 mg of an aqueous solution containing 37 wt % hydrochloric acid was added. This mixture was heated to 80° C. for 1 hour, and then cooled down.

29.5 g of $Al_2O_3$ support (1/16" γ-alumina extrudates) were placed under vacuum for 1 hour. About 50 ml of methanol was then added and the support was soaked for 1 hour. Excess methanol was then removed.

The cooled Pt—Re—Cl solution was impregnated onto the methanol-soaked support, and kept overnight (12 hours) at room temperature. The resulting sample was then transferred to an oven at about 85° C. and dried overnight. After drying, the supported catalyst was calcined under flowing air as follows:

(1) temperature was raised from ambient to 120° C. at 3° C. per minute, (2) 2-hour holding period at 120° C., (3) temperature was raised from 120° C. to 300° C. at 3° C. per minute, (4) 2-hour holding period at 300° C., (5) temperature was raised from 300° C. to 500° C. at 1° C. per minute, (6) 2-hour holding period at 500° C.

The catalyst was then cooled to room temperature. The resulting catalyst had 0.27% wt Pt, 0.41% wt Re and 0.96% wt Cl.

Example 3

Example 3 describes a method of manufacturing a Pt—Re reforming catalyst using a dispersing agent according to the present invention and loading the catalyst with 0.57 wt % Cl. The sample was prepared following the same procedure as Example 2, but using only half the amount of 37% wt solution of hydrochloric acid (0.276 mg).

TABLE 1

|  | Pt (wt %) | Re (wt %) | Cl (wt %) |
|---|---|---|---|
| Example 1 | 0.25 | 0.40 | 1.0 |
| Example 2 | 0.27 | 0.41 | 0.96 |
| Example 3 | 0.22 | 0.40 | 0.57 |

Table 2

The catalyst from examples 1-3 were then tested in a reforming reaction. The following test conditions were used, which are representative of commercial reforming practice:

| | |
|---|---|
| Temperature: | 930° F. |
| Pressure: | 325 psig |
| Hydrogen/naphtha molar ratio: | 10 |
| Liquid hourly space velocity ($h^{-1}$): | 1.65 |

The performance of the catalysts of Examples 1-3 in the reforming reaction are shown in Table 2 below.

TABLE 2

| | Time on stream (h) | | | | | | | | |
| --- | --- | --- | --- | --- | --- | --- | --- | --- | --- |
| | 24 | | | 48 | | | 72 | | |
| Catalyst | RON | C$_{5+}$ (wt %) | oc- tane- bbl | RON | C$_{5+}$ (wt %) | oc- tane- bbl | RON | C$_{5+}$ (wt %) | oc- tane- bbl |
| Example 1 | 93.7 | 83.3 | 73.7 | 93.1 | 83.6 | 73.7 | 92.7 | 83.7 | 73.5 |
| Example 2 | 93.4 | 83.2 | 73.8 | 92.6 | — | — | 92.0 | 84.9 | 74.6 |
| Example 3 | 92.6 | 87.5 | 76.8 | 92.6 | 87.4 | 76.8 | 92.8 | 87.5 | 77.1 |

The main goal of the reforming process is to improve the octane number of naphtha feedstocks to make the feedstocks suitable for blending in gasoline, while at the same time maximizing the amount of liquid products (C$_{5+}$ and heavier) that can be used as gasoline. The formation of undesirable light gases (C$_1$-C$_4$) from the original naphtha is largely the result of hydrocracking, which is one of several simultaneous reactions taking place in the reforming process. Thus, the key performance measure of a reforming catalyst combines its octane number enhancement with the amount of C$_{5+}$ in the final product. This is usually referred to as octane-barrel (octane-bbl) number.

As seen in table 2, the research octane number (RON) of the reformate is relatively similar in all of Examples 1-3. However, when comparing overall performance, as measured by octane-barrel yield, Example 3, where the catalyst was prepared with significantly lower halogen level, shows a clear advantage over the catalysts of Examples 1. The main reason for the octane-barrel gain in Example 3 is the remarkable improvement in C$_{5+}$ production, or, in other words, the lower formation of undesired light gases by hydrocracking. This improvement is also shown in Example 2, but to a lesser degree.

It is believed that the substantial improvement in C$_{5+}$ product obtained in Examples 2 and 3 is due, at least in part, to the smaller and more active nanocatalyst particles of the catalyst of the present invention. The catalysts are smaller and in closer proximity to the promoter, which permits a reduction in the amount of promoter on the catalyst while still maintaining high catalyst activity. Catalytic performance and composition data from Tables 1 and 2 shows that the reduced halogen promoter loading in Examples 2 and 3 reduces the rate of hydrocracking and results in reduced C$_1$-C$_4$ formation. It is well known that conventional reforming catalysts require higher halogen loading (typically greater than 1% by weight of Cl) for adequate catalyst performance. This requirement also translates into a higher production of light gases, and ultimately produces inferior performance compared to the low-halogen catalysts prepared according to the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for manufacturing a reforming catalyst having improved C$_{5+}$ production for upgrading liquid fuels to higher octane fuels, comprising:
   (i) providing a plurality of catalyst atoms comprising one or more metals selected from the group consisting of platinum, palladium, rhodium, and iridium;
   (ii) providing a dispersing agent comprising a plurality of organic molecules that have at least one functional group capable of binding to the plurality of catalyst atoms;
   (iii) reacting the dispersing agent with the catalyst atoms to form a catalyst precursor;
   (iv) causing or allowing the catalyst precursor to form nanocatalyst particles having a size less than about 100 nm and supporting the nanocatalyst particles on a solid catalyst support; and
   (v) including a halogen promoter in the reforming catalyst in an amount from about 0.2% to less than 1.0% by weight of the reforming catalyst.

2. A method as in claim 1, the amount of halogen promoter being in a range of about 0.3% to about 0.9% by weight of the reforming catalyst.

3. A method as in claim 1, the amount of halogen promoter being in a range of about 0.4% to about 0.7% by weight of the reforming catalyst.

4. A method as in claim 1, the amount of halogen promoter being in a range of about 0.4% to about 0.9% by weight of the reforming catalyst.

5. A method as in claim 1, the halogen promoter comprising chloride.

6. A method as in claim 1, the at least one functional group being selected from the group consisting of a hydroxyl, a carboxyl, a carbonyl, an amide, an amine having a lone pair of electrons, a thiol, a sulfonic acid, sulfonyl halide, an acyl halide, derivatives thereof, and combinations thereof.

7. A method as in claim 1, at least a portion of the dispersing agent molecules being selected from the group consisting of polyacrylic acid, polyacrylic acid salts, polyvinylbenzoates, polyvinyl sulfate, polyvinyl sulfonates including sulfonated styrene, polybisphenol carbonates, polybenzimidizoles, polypyridine, sulfonated polyethylene terephthalate, polyvinyl alcohol, polyethylene glycol, polypropylene glycol, derivatives thereof, and combinations thereof.

8. A method as in claim 1, the at least a portion of the dispersing agent molecules being selected from the group consisting of glycine, alanine, glycolic acid, lactic acid, sugar, glucose, citric acid, hydroxy dicarboxylic acids, oxalic acid, malonic acid, maleic acid, ethanolamine, mercaptoethanol, 2-mercaptoacetate, sulfobenzyl alcohol, sulfobenzoic acid, sulfobenzyl thiol, sulfobenzyl amine, derivatives thereof, and combinations thereof.

9. A method as in claim 1, the nanocatalyst particles further comprising one or more of tin, rhenium, germanium, lead, arsenic, antimony, tungsten, osmium, cadmium, indium, titanium, phosphorus, gallium, ruthenium, calcium, magnesium, barium, or strontium.

10. A method as in claim 1, the nanocatalyst particles comprising platinum as a primary catalyst component and one or more of tin, rhenium or iridium as a secondary catalyst component.

11. A method as in claim 1, the nanocatalyst particles having a size less than about 50 nm.

12. A method as in claim 1, the nanocatalyst particles having a size less than about 10 nm.

13. A method as in claim 1, the support material comprising at least one of silica, alumina, zeolites, or a metal oxide.

14. A method as in claim 1, the nanocatalyst particles having a crystal face exposure that is at least about 50% {110} or at least about 50% {111}.

15. A method of reforming hydrocarbons having increased $C_{5+}$ production, comprising catalyzing the formation of at least one of an aromatic compound or a branched paraffin using the reforming catalyst of claim 1.

16. A reforming catalyst having improved $C_{5+}$ production for upgrading liquid fuels to higher octane fuels, the catalyst comprising:
   a support material;
   a plurality of uniformly dispersed nanocatalyst particles on the support material, the nanocatalyst particles comprising a metal selected from the group consisting of platinum, palladium, rhodium, iridium, and combinations thereof, wherein the nanocatalyst particles have an average diameter of less than about 100; and
   a halogen promoter included in the reforming catalyst in an amount from about 0.2% to less than 1.0% by weight of the reforming catalyst.

17. A reforming catalyst as in claim 16, the halogen promoter comprising chloride ion.

18. A reforming catalyst as in claim 16, the amount of halogen promoter being in a range of about 0.3% to about 0.9% by weight of the reforming catalyst.

19. A reforming catalyst as in claim 16, the amount of halogen promoter being in a range of between about 0.4% to about 0.7% by weight of the reforming catalyst.

20. A reforming catalyst as in claim 16, in which at least about 50% of the atoms at the surface of the nanocatalyst particles have a {110} or a {111} crystal face exposure.

21. A reforming catalyst as in claim 16, the nanocatalyst particles comprising platinum as a primary catalyst component and one or more of tin, rhenium or iridium as a secondary catalyst component.

22. A reforming catalyst as in claim 16, the nanocatalyst particles having a size less than about 10 nm.

23. A reforming catalyst as in claim 16, the nanocatalyst particles comprising a plurality of dispersing agent molecules.

24. A reforming catalyst as in claim 23, at least a portion of the dispersing agent molecules being selected from the group consisting of polyacrylic acid, polyacrylic acid salts, polyvinylbenzoates, polyvinyl sulfate, polyvinyl sulfonates including sulfonated styrene, polybisphenol carbonates, polybenzimidizoles, polypyridine, sulfonated polyethylene terephthalate, polyvinyl alcohol, polyethylene glycol, polypropylene glycol, derivatives thereof, and combinations thereof.

25. A reforming catalyst as in claim 23, the at least a portion of the dispersing agent molecules being selected from the group consisting of glycine, alanine, glycolic acid, lactic acid, sugar, glucose, citric acid, hydroxy dicarboxylic acids, oxalic acid, malonic acid, maleic acid, ethanolamine, mercaptoethanol, 2-mercaptoacetate, sulfobenzyl alcohol, sulfobenzoic acid, sulfobenzyl thiol, sulfobenzyl amine, derivatives thereof, and combinations thereof.

26. A method of reforming hydrocarbons having increased $C_{5+}$ production, comprising catalyzing the formation of at least one of an aromatic compound or a branched paraffin using the reforming catalyst of claim 16.

27. A method of reforming hydrocarbons, comprising,
   providing a reactor having a reforming catalyst therein, the reforming catalyst comprising,
      a support material;
      a halogen promoter included in the reforming catalyst in an amount from about 0.2% to less than 1.0% by weight of the reforming catalyst; and
      a plurality of uniformly dispersed multicomponent catalyst nanoparticles having a size less than about 100 nm on the support material, the multicomponent catalyst nanoparticles comprising platinum as a primary component and at least one of tin, rhenium or iridium as a secondary catalyst component; and
   introducing a hydrocarbon feedstream into the reactor under conditions suitable for catalyzing the reforming of at least a portion of the hydrocarbon feedstream to at least one of aromatic compounds or branched paraffins.

28. A method as in claim 27, in which the nanocatalyst particles have a size less than about 50 nm.

29. A method as in claim 27, in which the nanocatalyst particles have a size less than about 10 nm.

30. A method as in claim 27, in which at least about 50% of the atoms at the surface of the nanocatalyst particles have a {110} or a {111} crystal face exposure.

* * * * *

UNITED STATES PATENT AND TRADEMARK OFFICE
CERTIFICATE OF CORRECTION

PATENT NO.        : 7,541,309 B2
APPLICATION NO.   : 11/435580
DATED             : June 2, 2009
INVENTOR(S)       : Trevino et al.

It is certified that error appears in the above-identified patent and that said Letters Patent is hereby corrected as shown below:

Title Page
Item 56, References Cited, U.S. Patent Documents, change "3,625,879  A    12/1971  Horner et al." to --3,625,879  A    12/1971  Horne et al.--
Item 56, References Cited, Other Publications, Page 3, change "Office Action dated Mar. 6, 2008 cited in U.S. Appl. No. 11/435,165" to --Office Action dated Feb. 6, 2008 cited in U.S. Appl. No. 11/435,165--

Column 1
Line 36, change "hydrocarbons" to --hydrocarbon--

Column 2
Line 59, change "catalyst" to --catalysts--
Line 61, change "importantly" to --importantly,--

Column 3
Line 21, change "1.0" to --1.0%--

Column 4
Line 17, change "preferably" to --preferably,--
Line 39, change "using a metal salts" to --using metal salts--

Column 5
Line 1, change "catalysts sites" to --catalyst sites--

Column 10
Line 57, change "Finally" to --Finally,--

Signed and Sealed this

Twenty-second Day of December, 2009

David J. Kappos
*Director of the United States Patent and Trademark Office*